(12) United States Patent
Medina et al.

(10) Patent No.: US 10,288,391 B2
(45) Date of Patent: May 14, 2019

(54) SHAPED CHARGE AND APPLICATION FOR SEPARATING TWO STAGES OF AN AERONAUTICAL CRAFT OR NEUTRALIZING THE SAME

(71) Applicant: Airbus Defence and Space SAS, Les Mureaux (FR)

(72) Inventors: Felipe Medina, La Celle-Saint-Cloud (FR); Luc Preaud, Gargenville (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 15/114,235

(22) PCT Filed: Feb. 3, 2015

(86) PCT No.: PCT/EP2015/052172
§ 371 (c)(1),
(2) Date: Jul. 26, 2016

(87) PCT Pub. No.: WO2015/117945
PCT Pub. Date: Aug. 13, 2015

(65) Prior Publication Data
US 2017/0010077 A1    Jan. 12, 2017

(30) Foreign Application Priority Data
Feb. 4, 2014    (FR) ...................................... 14 50855

(51) Int. Cl.
*F42B 1/032*    (2006.01)
*F42B 1/028*    (2006.01)
(Continued)

(52) U.S. Cl.
CPC .............. *F42B 1/032* (2013.01); *B64G 1/645* (2013.01); *F42B 1/028* (2013.01); *F42B 15/36* (2013.01); *F42B 15/38* (2013.01)

(58) Field of Classification Search
CPC .. F42B 1/02; F42B 1/028; F42B 1/032; F42B 15/36; F42B 15/38; B64G 1/64; B64G 1/645
(Continued)

(56) References Cited

U.S. PATENT DOCUMENTS 2,972,948 A    2/1961    Kray
3,244,104 A    4/1966    Mills et al.
(Continued)

FOREIGN PATENT DOCUMENTS

EP    0971199    1/2000
JP    S4216718    9/1967
(Continued)

OTHER PUBLICATIONS

International Search Report, dated Apr. 9, 2015, priority document.

*Primary Examiner* — James S Bergin
(74) *Attorney, Agent, or Firm* — Greer, Burns & Crain, Ltd.

(57) ABSTRACT

A shaped charge comprising a containment shell, an explosive charge placed in the containment shell and having a V-shaped surface, a fuse placed behind the explosive charge, and a layer of projection material placed in front of the V-shaped surface of the explosive charge. A layer of pyrogenic material is used for heating the projection coating. This pyrogenic material can also be mixed with the explosive charge.

3 Claims, 4 Drawing Sheets

(51) Int. Cl.
*F42B 15/36* (2006.01)
*F42B 15/38* (2006.01)
*B64G 1/64* (2006.01)

(58) Field of Classification Search
USPC .................. 102/306, 307, 378; 89/1.14
See application file for complete search history.

(56) References Cited

U.S. PATENT DOCUMENTS

| | | | |
|---|---|---|---|
| 4,649,824 A | 3/1987 | Guay | |
| 6,453,788 B1 | 9/2002 | Lebet et al. | |
| 7,044,225 B2 * | 5/2006 | Haney | E21B 43/117 166/299 |
| 7,393,423 B2 * | 7/2008 | Liu | C06B 33/00 149/108.2 |
| 8,156,871 B2 * | 4/2012 | Behrmann | F42B 1/032 102/476 |
| 8,167,044 B2 * | 5/2012 | Huang | E21B 43/117 102/306 |
| 8,443,731 B1 * | 5/2013 | Stecher | F42B 1/032 102/306 |
| 8,685,187 B2 * | 4/2014 | Han | F42B 1/02 149/108.2 |
| 2003/0037692 A1 * | 2/2003 | Liu | C06B 33/00 102/301 |
| 2005/0056459 A1 * | 3/2005 | Haney | E21B 43/117 175/4.6 |
| 2011/0139505 A1 | 6/2011 | Huang et al. | |
| 2012/0110823 A1 | 5/2012 | Behar | |
| 2013/0126238 A1 | 5/2013 | Church et al. | |

FOREIGN PATENT DOCUMENTS

| | | |
|---|---|---|
| JP | 2012532786 | 12/2012 |
| WO | 2012013926 | 2/2012 |

* cited by examiner

SHAPED CHARGE AND APPLICATION FOR SEPARATING TWO STAGES OF AN AERONAUTICAL CRAFT OR NEUTRALIZING THE SAME

CROSS-REFERENCES TO RELATED APPLICATIONS

This application claims the benefit of the French patent application No. 14 50855 filed on Feb. 4, 2014, the entire disclosures of which are incorporated herein by way of reference.

FIELD OF THE INVENTION

The invention generally relates to shaped charges, for all the applications of industry, but in particular aeronautics.

BACKGROUND OF THE INVENTION

Shaped charges are a technology previously used to make up ammunitions, in particular for piercing armors. However, they can find many applications in industry, for example for severing cables, or deteriorating a connecting part, for separating two assemblies previously connected.

In reference to FIG. 1, a conventional shaped charge mainly comprises a hollow shaped shell 1, an explosive charge 2, placed inside the shell 1, a fuse 3, placed on a back surface 2A of the explosive charge, and a metal coating 4, placed on a front surface 2B of the explosive charge. It is set forth that the metal coating 4 is, preferably, of copper.

In reference to FIG. 2, the operation of the shaped charge is the following one. The fuse 3 is hit by a projected plate, as indicated by the arrow 5. The explosive charge 2 is thus triggered and comes into a detonation regimen. A wave is then propagated in the entire explosive bulk of the explosive charge 2. Because of the V hollow shape of the surface 2B of FIG. 1, an energy concentration is produced in the axis of the shaped charge and in particular at the bottom of the V of the surface 2B of the explosive charge 2. Thus, the coating 4 is then propelled and concentrated on the axis of the shaped charge to form a jet 6. The propagation speed of the jet 6 is expressed by the following formula:

$$V=2*D*\sin(\alpha/2),$$

where V is the jet speed, and D is the detonation speed.

It is understood that such a device can have many applications in industry, in particular in military weapons, for piercing armors.

The purpose of the invention is to provide an improved type of shaped charge for multiple applications, but in particular in aeronautics, especially for separating two stages of an aeronautical craft, such as a rocket and its launching stages.

SUMMARY OF THE INVENTION

A first object of the invention is thus a shaped charge comprising:
- a containment shell;
- an explosive charge, placed in the containment shell and having a V-shaped concave surface;
- a projection material coating, placed in front of the V-shaped concave surface of the explosive charge.

According to the invention, a pyrogenic material, that is, a heat generating material, is used, for heating the projection material coating.

In a first embodiment, the pyrogenic material is placed on the V-shaped concave surface of the explosive charge, the projection material coating being placed on the pyrogenic material.

In a second embodiment of the invention, the pyrogenic material is mixed in the explosive charge.

A second main object of the invention is a device for separating two stages of an aeronautical craft, both stages being connected to each other by a connecting part.

According to the invention, a shaped charge, as previously defined, having a circular shape placed around the connecting part, is used, the pyrogenic material being placed in front of an inner surface of this connecting part.

A third main object is a device for neutralizing a part of an aeronautical craft.

According to the invention, a shaped charge, as previously defined, is used, the pyrogenic material being placed facing an inner surface of the aeronautical craft.

Two possibilities are contemplated, the first one being to use a circular crown of this shaped charge placed against the inner surface of a part of the aeronautical craft to be destroyed, whereas a second possibility is to use a rectilinear-shaped shaped charge, which is being placed against an inner surface of the part of the aeronautical craft to be neutralized, that is, to be destroyed, longitudinally, with respect to the axis of the aeronautical craft.

BRIEF DESCRIPTION OF THE DRAWINGS

The invention and its different technical characteristics will be better understood upon reading the following description, accompanied with several figures, representing respectively.

DETAILED DESCRIPTION OF THE PREFERRED EMBODIMENTS

Figure 3:
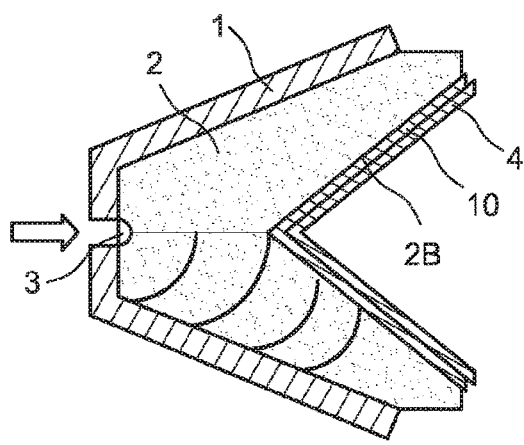
FIG. 3, in a cross-section view, a hollow charge according to the invention, in a first embodiment.

In reference to FIG. 3, the shaped charge according to the invention comprises, as that of prior art, a shell 1, wherein an explosive charge 2 is placed, always with a concave V-shape, being encircling or elongated, and covered with a projection coating 4 which is metallic. Of course, a fuse 3 is placed behind the explosive charge 2 to be capable of detonating the shaped charge.

According to the invention, in the first embodiment according to the invention, a layer of pyrogenic material 10 is placed on the V-shaped surface 2B of the explosive charge 2, and behind the projection coating 4. In other words, the pyrogenic material 10 is sandwiched between the projection coating 4 and the explosive charge 2.

Figure 1:
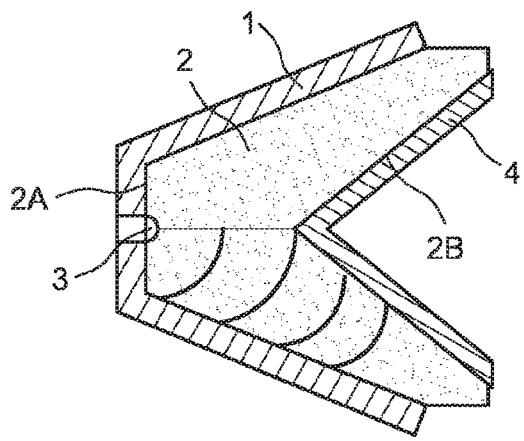
FIG. 1, in a cross-section view, a shaped charge according to prior art, before its operation.
Figure 2:
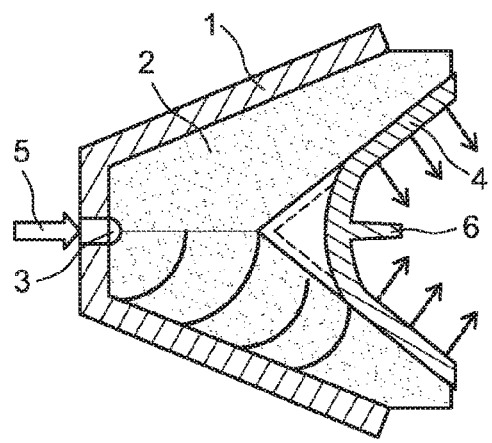
FIG. 2, in a cross-section view, the same shaped charge according to prior art, but during its operation.

This pyrogenic, that is, heat-generating, material 10, is preferably thermite, or nanothermites. Upon initiating a detonation regimen of the explosive charge 2 by triggering the fuse 3, a propagation wave is propagated in the entire explosive charge 2 and reaches the V-shaped concave surface 2B. The layer of pyrogenic material 10, then starts being peeled off and being very quickly heated. The jet 6, described in FIG. 2, is then formed, with an amalgam of the pyrogenic material 10 and the projection coating 4. Under the action of the shock wave, there is thus a gradual raising of all of the pyrogenic material 10 and the projection coating 2, with the amalgam being very quickly warmed up and melted.

To the mechanical effect of projecting the jet 6 (FIG. 2), is thereby added a thermal effect, enabling the target to be more easily melted.

The choice of the projection coating 4 is preferably made as a function of the target and the density thereof. This choice can be defined by the following formula:

$$P = L \cdot \sqrt{\rho_j} / \rho_c,$$

where ρj is the density of the material of the projection coating,

ρc is the target density,

L being the jet length, and

P being the penetration length of the jet in the target.

The choice of the nanothermites or thermites making up the pyrogenic material 10 is made as a function of the material of the projection coating 4, as well as the jet path time, which strongly depends on the density of the coating of the projection material 4 and the explosive charge 2. The purpose is to achieve a temperature maximum, at the time of the jet impact, on the target.

Figure 4:
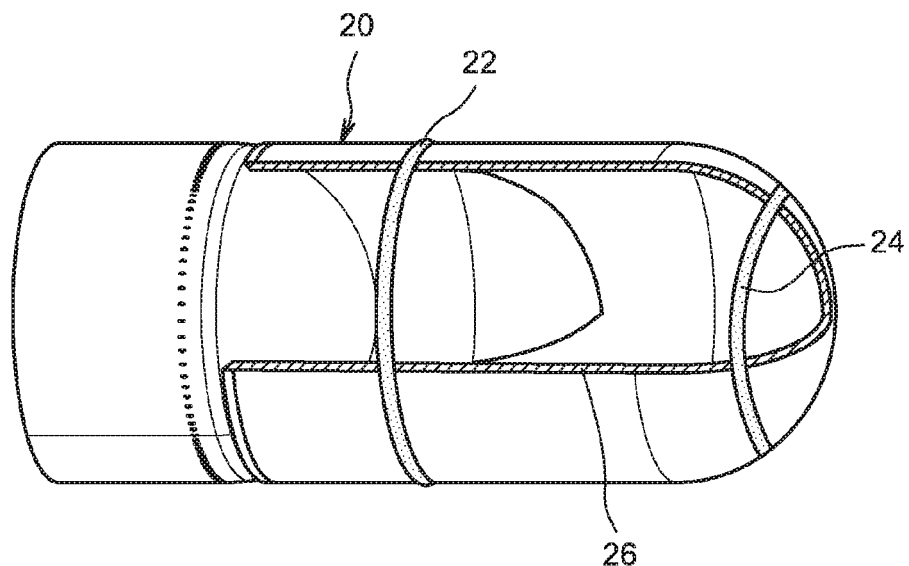
FIG. 4, three types of application of the shaped charge according to the invention.

In reference to FIG. 4, the front of an aeronautical craft is represented. On the wall 20 thereof, three shaded parts 22, 24 and 26 are represented. The parts 22 and 24 are encircling parts bonded to the inner surface of the wall 20 of the aeronautical craft. They each comprise a crown comprising a shaped charge as previously described. The V-shaped concave surface, covered with the projection coating, is directed against this inner surface of the wall 20 of the aeronautical craft. The crown 22 is placed on the cylindrical part of the aeronautical craft, where it is decided to make an intrusion for neutralizing, that is, destroying, the craft.

The crown 24 is placed inside the front part of the aeronautical craft, on an inner surface which is not cylindrical, but conical or ogive-shaped, for example, the bottom of a tank. The coating of the projection material is always directed against the inner surface of the wall 20 of this aeronautical craft.

Finally, the part 26 is an elongated part made of a bar, formed by a shaped charge, as previously described, the projection coating being also directed against the inner surface of the wall 20 of the aeronautical craft.

These different crowns and bars are placed facing the part desired to be destroyed and/or neutralized.

Figure 5C:
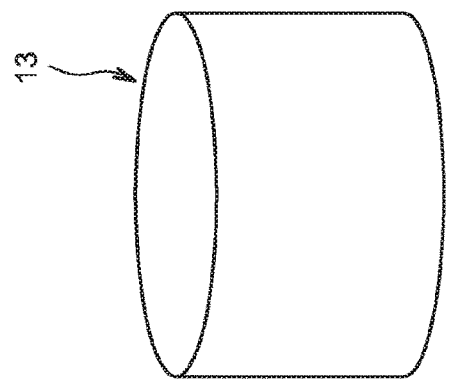
FIGS. 5A to 5C, three diagrams representing the application of the shaped charge according to the invention for separating two parts of an aeronautical launcher.
Figure 5B:
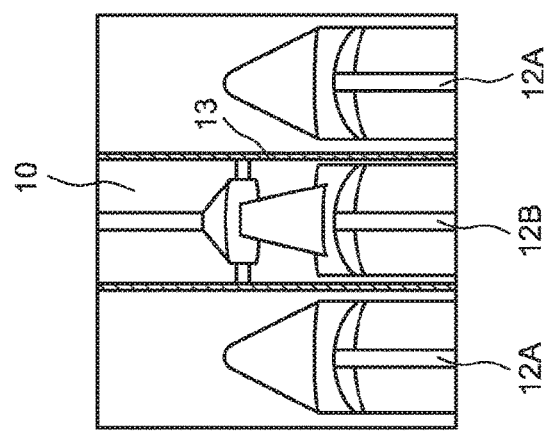
Figure 5A:
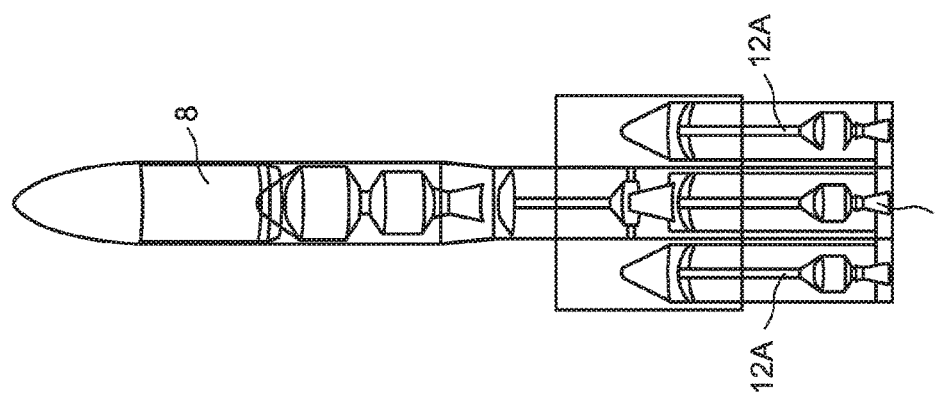

FIG. 5A represents the stages 8 of an aeronautical launcher, equipped with several rocket motors 12A and 12B, placed at the base of the stages 8 of the aeronautical launcher.

FIG. 5B shows a detail of this assembly, in particular at the upper part of the rocket motors 12A and 12B. Indeed, it is seen that the center rocket motor 12B is topped by the stages 8. This connection is made by a connecting crown 13, which is represented apart in FIG. 5C.

Figure 6A:
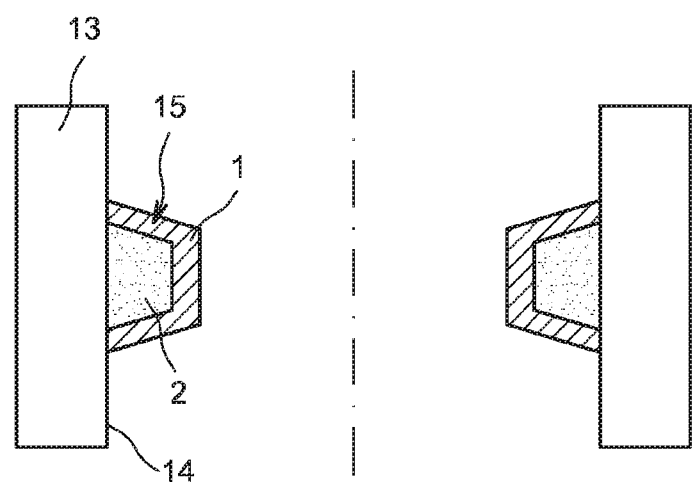
FIGS. 6A, 6B and 6C, diagrams relating to the operation of this application.

The operation of the separating device according to the invention is illustrated in FIG. 6A, in a detailed cross-section view, at the connecting crown 13. This includes, on its inner wall 14, a shaped charge crown 15. The later mainly comprises the shell 1, being torical and opened on the side of its external diameter. It is filled with the explosive charge 2 containing or being covered by the pyrogenic material and by the projection coating.

Figure 6B:
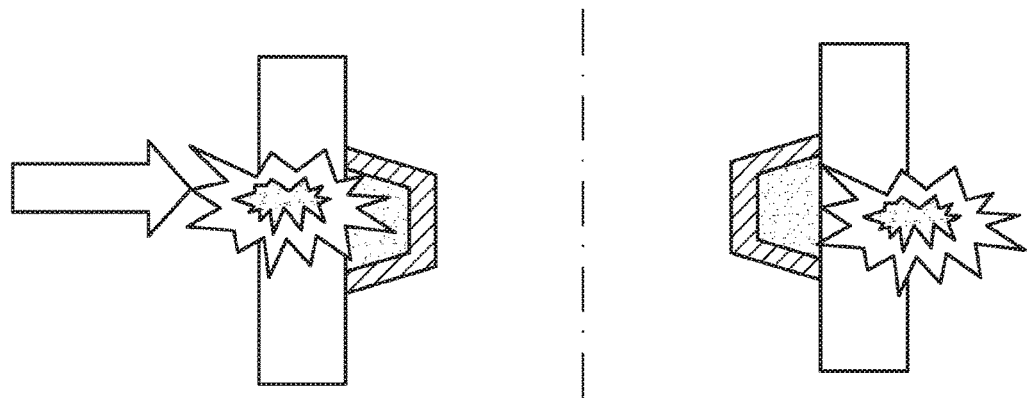
Figure 6C:
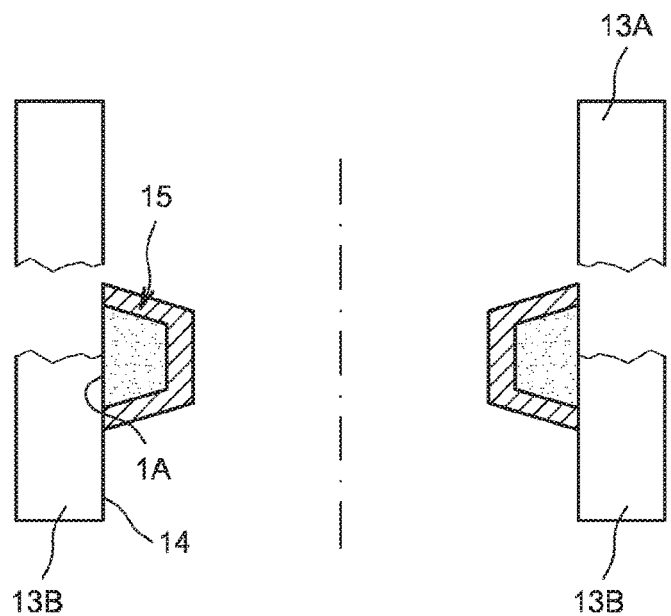

In reference to FIG. 6B, the firing of the shaped charge 15 causes an abrupt warming up, until the parts of the connecting crown 13 facing thereto are molten. The warming up of this part of the connecting crown 13, up to its melting point, causes this crown 13 to be separated into two parts. These two parts are represented in FIG. 6C, being an upper part 13A and a lower part 13B. It is understood, in this FIG. 6C, that the shaped charge 15 has been attached beforehand by one of the edges 1A of the shell 1, to the wall 14 of the connecting crown 13. Hence, after both lower 13B and upper 13A parts of the connecting crown 13 are separated, the shaped charge 15 remains integral with one of both parts, here the lower part 13B of the connecting crown 13. Indeed, in the application to an aeronautical launcher, it is chosen that the shaped charge 15 remains integral with the lower stage, which does not continue the flight of the aeronautical craft and falls back onto the ground. This enables the prevention of the structure continuing the flight from being warmed up for a duration longer than necessary.

In two different embodiments of the device according to the invention, the connecting crown 13 can be a part on its own, that is, being part neither of a first element, nor of a second element, which have to be separated, that is, the stages 8 and the center rocket motor 12B. This connecting crown 13 is then welded, by its two ends, to both of these elements.

In a second embodiment, it is contemplated that the connecting crown 13 is an integral part of the wall of one of both elements, preferably the lower element, that is, the center rocket motor 12B. In other words, in this case, the connecting crown 13 extends from the outer wall of this center rocket motor 12B.

Remote pyrotechnic triggering means are provided for initiating the explosion of the shaped charge 15.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for neutralizing a part of an aeronautical craft or a space craft, the device comprising:
   a shaped charge comprising:
      a containment shell forming a ring;
      an explosive charge, placed in the containment shell, having a V-shaped concave surface;
      a fuse, placed behind the explosive charge;
      a projection coating, placed in front of the V-shaped concave surface of the explosive charge; and
      a pyrogenic material for heating the projection coating, the pyrogenic material being placed on the V-shaped concave surface of the explosive charge, the projection coating being placed on the pyrogenic material, and, the pyrogenic material being placed against an inner surface of a wall of the aeronautical craft or the space craft.

2. The neutralizing device according to claim 1, wherein the shaped charge encircles and surrounds at least a portion of the aeronautical craft or the space craft.

3. The neutralizing device according to claim 1, wherein the shaped charge is elongated and is placed on a generator of the inner surface of the wall of the aeronautical craft or the space craft.

\* \* \* \* \*